United States Patent Office 2,959,864
Patented Nov. 15, 1960

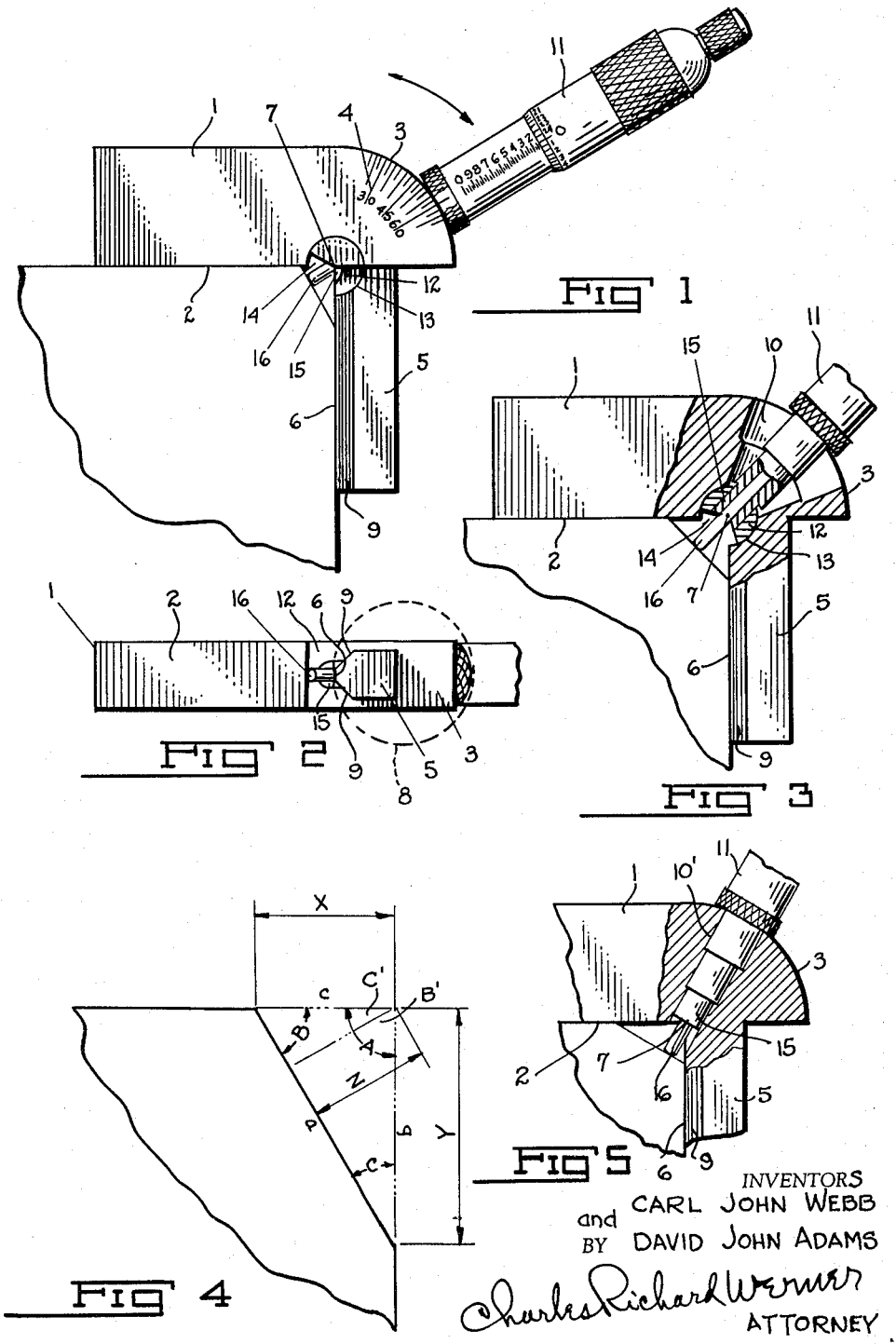

2,959,864
CHAMFER GAUGE

Carl John Webb, 10918 S. Lyman Ave., Chicago Ridge, Ill., and David John Adams, 51B SW. Trailer Court, Worth, Ill.

Filed Nov. 16, 1955, Ser. No. 547,187

6 Claims. (Cl. 33—170)

This invention relates in general to precision instruments and in particular to a chamfer gauge.

In forming a chamfer on the edge of a piece of stock or around the periphery of an aperture, after the stock is cut away it is difficult to accurately make measurements to determine if the dimensions in the specifications have been reached.

In the specifications for a chamfer generally the angle and dimension of one side are given. The other side and angle can be calculated or ignored as long as the given dimensions are observed. By using the known dimensions and geometric formulas the length of a perpendicular from the vertex of the two sides to the surface of the chamfer can be obtained and by accurately measuring this perpendicular as machining progresses one can determine when the specified dimensions have been reached.

It is therefore the primary object of our invention to provide a chamfer gauge in which a pair of angularly related legs are placed on the stock being machined and a micrometer spindle adjusted to determine the distance from the vertex of the legs to the face of the chamfer.

It is a second object of our invention to pivotally mount the micrometer so that it can be used at any desired angle within a predetermined range.

These, and other objects, as well as the construction and use of our invention will be better understood by reference to the following specification in connection with the accompanying drawing in which:

Fig. 1 is a front view of the chamfer gauge in measuring position on a fragmentary piece of material on which a chamfer is being machined.

Fig. 2 is a bottom view of the chamfer gauge with parts being broken away in section.

Fig. 3 is a view similar to Fig. 1 with parts being broken away in section and the micrometer at a different angle from that shown in Fig. 1.

Fig. 4 is a diagrammatic view used to explain the theory of operation of our invention.

Fig. 5 is a view similar to Fig. 3 in which a micrometer is affixed to the gauge at a predetermined nonadjustable angle.

Referring now to the drawing by numerals of reference, 1 designates a block or straightedge having precision machined surface 2 and an arcuate end 3 with indicia 4 denoting degrees.

An angular projecting member 5 extends from the straightedge 1 with the machined surface 6 intersecting the surface 2 at a point 7 which forms the vertex of the angle between the surfaces 2 and 6 and which is also the center from which a radius swings to form the arc of end 3. Straightedge 1 and projecting member 5 are in the same plane.

The angular projecting member 5 is reduced in cross sectional area from that of straightedge 1 as shown in Fig. 2 for insertion into any circular or other aperture 8 for gauging a circumferential chamfer, the projecting member 5 being beveled at 9 to aid in this function, the machined surface 6 being materially reduced thereby.

The end 3 of the straightedge 1 has an angular recess 10 in which micrometer 11 of standard construction may operate.

A pivot block 12 is machine fit in recess 13, the pivotal center of the block 12 coinciding with the vertex or point 7 for movement of the micrometer in the arc of straightedge end 3.

A sector 14 of the pivot block 12 is removed whereby block 12 can be swung through the desired arc of angular measurement without contacting the work being gauged.

The micrometer end 15 is securely carried in the pivot block 12 and micrometer spindle 16 is adjustably extendible, its longitudinal axis being coplanar with the plane of the straightedge 1 and the projecting member 5, said axis passing through the center or vertex 7. Straightedge 1 and projecting member 5 form a right angle and the micrometer is located in the reflex angle opposite the right angle, the spindle being extendible into the right angle area. The 1956 edition of the Encyclopaedia Britannica, on page 929, at the top of the left hand column defines a "reflex angle" as an angle between 180° and 360°.

The diagrammatic view in Fig. 4 illustrates the theory of operation of our invention. In machine shop practice, when a chamfer or bevel is to be formed, the machinist is given angle B or C, and the dimensions of one or both of the sides X or Y. Without knowing the dimension Z it is impossible to accurately measure X and Y since there are no micrometer means to do so. Also on certain pieces of work they must be removed from the machine before any measurements at all can be made. When chamfers are being machined about a circular aperture, it is virtually impossible to obtain measurement Y.

In using our invention, however, given only one of the angles B or C, and one side X or Y, certain mathematical formulas apply and standard trigonometric tables are available so the correct figures, accurate to four or more places can be quickly obtained.

As an example, given B equals 60° and X equals .058 inch, the formula is:

Length of Opposite side (Z) equals Hypotenuse (X) divided by Cosecant of angle B. We substitute values given: Z equals .058 over 1.1547 and we find that Z equals .0502 inch.

Machining of the chamfer continues until the micrometer reading reaches .067 inch, with the angle of the micrometer set at 60°. Also, by taking a micrometer reading and using the angle at which the machine cut is being made, the lengths of $a$, $b$ or $c$ can be determined by using known formulas.

In Fig. 5, the micrometer 11 with end 15 may be fixed in an aperture 10' with the spindle 16 passing through the vertex 7 at a fixed angle. Sets of such instruments at different angles may be used where standard chamfers are cut.

The micrometer can be a dial gauge type with a yieldable spindle, said spindle passing through the vertex in the same manner as the longitudinally adjustable spindle.

Insofar as we are aware, there is no precision instrument which can be placed adjacent a chamfer and an accurate reading obtained which will aid in calculating various functions of the chamfer.

We have devised an extremely simple and accurate instrument which can be used wherever a chamfer is formed including peripheral internal chamfers about an aperture, to measure the various functions of said chamfer.

It is obvious that changes in form, proportion and details of construction may be resorted to without departing from the spirit of our invention and we reserve all rights to such changes as come within the scope of these specifications and the claims which follow.

What we claim as new and desire to secure by Letters Patent is:

1. A chamfer gauge comprising a pair of right angularly related coplanar rectilinear legs forming a vertex therebetween, a pivot block located at the juncture of the legs and movable concentrically about the vertex formed by the legs, a micrometer carried by the pivot block and angularly movable therewith, said micrometer being provided with a spindle and located in the reflex angle opposite the right angle formed by the legs, stop means limiting the angular movement of the micrometer, the spindle of the micrometer being extendible into the right angle between the legs and adapted to measure the distance from the vertex to the planar face of a chamfer on a part being gauged, said pivot block having a sector shaped aperture of an arc greater than the pivotal range of the block and micrometer as determined by the stop means whereby said block will not interfere with the effective use of the chamfer gauge at the extreme limits of the angular movement of the micrometer.

2. The structure as specified in claim 1, said stop means comprising a slotted aperture between the legs, said micrometer being at least partially located in and movable arcuately along said slotted aperture.

3. The structure as specified in claim 1, one of said legs being reduced in cross sectional area for entry into an aperture about which the chamfer being gauged is located.

4. The structure as specified in claim 1, one of said legs being provided with a curved end formed by an arc swung with the vertex as a center, said curved end being provided with an aperture extending to the pivot block, said micrometer being pivotally operable and arcuately adjustable within said aperture.

5. The structure as specified in claim 4, the other leg being reduced in cross sectional area for entry into an aperture about which the chamfer being gauged is located.

6. The structure as specified in claim 3, the reduced leg being provided with beveled edges reducing the contact area of the reduced leg with the wall of the aperture in which the reduced leg is inserted.

References Cited in the file of this patent

UNITED STATES PATENTS

| | | |
|---|---|---|
| 672,382 | Lucy | Apr. 16, 1901 |
| 746,070 | Gillner et al. | Dec. 8, 1903 |
| 769,992 | Engel | Sept. 13, 1904 |
| 963,405 | Stollberg | July 5, 1910 |
| 996,901 | Ball | July 4, 1911 |
| 997,989 | Glickert | July 18, 1911 |
| 1,217,850 | Smith | Feb. 27, 1917 |
| 1,339,384 | Douglass | May 11, 1920 |
| 1,416,810 | Foster | May 23, 1922 |
| 1,971,628 | Sutterlin | Aug. 28, 1934 |
| 2,347,454 | Beckett | Apr. 25, 1944 |
| 2,391,020 | Jackman | Dec. 18, 1945 |
| 2,474,577 | Gancer | June 28, 1949 |
| 2,599,835 | Johnson et al. | June 10, 1952 |
| 2,614,329 | Almorth | Oct. 21, 1952 |
| 2,654,153 | Oyler | Oct. 6, 1953 |

FOREIGN PATENTS

| | | |
|---|---|---|
| 127,704 | Great Britain | June 2, 1919 |
| 527,663 | Great Britain | Aug. 14, 1940 |
| 904,282 | France | Feb. 19, 1945 |